United States Patent [19]

Dobler et al.

[11] Patent Number: 5,615,939

[45] Date of Patent: Apr. 1, 1997

[54] HEADLIGHT OF A SELF-PROPELLED VEHICLE, ESPECIALLY FOR A MOTOR VEHICLE

[75] Inventors: Karl-Otto Dobler; Wolfgang Krieg, both of Reutlingen, Germany

[73] Assignee: Robert Bosch GmbH, Stuttgart, Germany

[21] Appl. No.: 589,286

[22] Filed: Jan. 22, 1996

[30] Foreign Application Priority Data

Mar. 4, 1995 [DE] Germany ............................ 19507586.2

[51] Int. Cl.⁶ ...................................... B60Q 1/06
[52] U.S. Cl. ............................ 362/66; 362/272; 362/282; 362/421; 362/424
[58] Field of Search ................................ 362/66, 70, 272, 362/277, 282, 284, 421, 422, 423, 424, 425

[56] References Cited

U.S. PATENT DOCUMENTS

| | | | |
|---|---|---|---|
| 4,674,013 | 6/1987 | Manzoni | 362/66 |
| 5,251,114 | 10/1993 | Cantin et al. | 362/272 |
| 5,256,238 | 6/1996 | Van Oel et al. | 362/66 |
| 5,355,287 | 10/1994 | Denley | 362/66 |
| 5,365,415 | 11/1994 | Schmitt et al. | 362/66 |
| 5,452,185 | 9/1995 | Arlon et al. | 362/66 |
| 5,530,629 | 6/1996 | Uehara | 362/66 |

FOREIGN PATENT DOCUMENTS 2431095 8/1976 Germany.

Primary Examiner—Ira S. Lazarus
Assistant Examiner—Alfred Basichas
Attorney, Agent, or Firm—Michael J. Striker

[57] ABSTRACT

The headlight for a self-propelled vehicle includes a pivotable reflector (12) having a reflector pivot axis (20), a holder (10) for the reflector (12) and a compact mechanism for pivoting the reflector (12) relative to the holder (10) to adjust the orientation of the reflector. This compact adjusting mechanism for the reflector includes an adjusting element (26) having a ball end (30) and eccentrically engaged with the reflector (12) relative to the reflector pivot axis (20) and a compact double-jointed pivot joint for pivotally connecting the adjusting element (26) with the reflector (12). This compact double-jointed pivot joint includes a pivot joint mount (36) provided with a spherical receptacle (42), a socket insert (50) having a spherical-segment-shaped outer section (52) pivotally engaged in the spherical receptacle (42) of the pivot joint mount (36). The socket insert (50) has a ball socket (54) in which the ball end (30) of the adjusting element (26) is engaged so that the adjusting element (26) is pivotally connected with the socket insert (50). The ball socket (54) of the socket insert (50) is closer to the reflector (12) than the spherical receptacle (42).

14 Claims, 3 Drawing Sheets

HEADLIGHT OF A SELF-PROPELLED VEHICLE, ESPECIALLY FOR A MOTOR VEHICLE

BACKGROUND OF THE INVENTION

The present invention relates to headlights for self-propelled vehicles, especially for motor vehicles.

A headlight for a self-powered vehicle is described in German Published Patent Application 24 31 095 A1. This headlight has a reflector, which is pivotally mounted in a holder and which is adjustable by means of an adjusting mechanism. The adjusting mechanism has an eccentric adjusting element engaging eccentrically to a pivot axis of the reflector, which is connected with the reflector by a universal joint. This pivot joint is formed by a pin which has two ball ends so that the pin is pivotally engaged with one ball end in a spherical receptacle connected with the reflector and is engaged with the other ball end in another spherical receptacle provided with a threaded passage. A threaded portion of the adjusting element is screwed in the threaded passage. This double pivotal connection is required to minimize bending moments and/or transverse forces of the adjusting element, which can occur because of the pivoting motion of the reflector caused by the adjusting element. The known double-jointed pivot joint with the pin and both spherical receptacles requires comparatively many parts and takes up a comparatively large space, particularly in the adjusting direction of the adjusting element, because it requires the pin provided with the ball ends. This double-jointed pivot joint can be used only when there is enough room.

SUMMARY OF THE INVENTION

It is an object of the present invention to provide a headlight for a self-propelled vehicle, especially a motor vehicle, which does not have the above-described disadvantages.

This object and others which will become more apparent hereinafter are attained in a headlight for a self-propelled vehicle, especially a motor vehicle, comprising at least one pivotable reflector having at least one reflector pivot axis, means for holding the at least one pivotable reflector and means for pivoting the reflector relative to the means for holding about the at least one reflector pivot axis for adjustment of a reflector orientation.

According to the invention the means for pivoting the reflector includes an adjusting element, advantageously a rod, having a ball end, eccentrically engaged with the reflector relative to the at least one reflector pivot axis and a double-jointed pivotal connection means for pivotally connecting the adjusting element with the reflector. The double-jointed pivotal connection means comprises a pivot means mount provided with a spherical receptacle, a socket insert having a spherical-segment-shaped outer section pivotally engaged in the spherical receptacle of the pivot means mount, the socket insert including a ball socket in which the ball end of the adjusting element is engaged so that the adjusting element is pivotally connected with the socket insert, while the ball socket of the socket insert is closer to the reflector than the spherical receptacle of the pivot means mount.

It is particularly advantageous that the headlight according to the invention has an adjusting mechanism with a double-jointed pivotal connection means including the pivot mounting means and socket insert which requires comparatively fewer parts and less space, particularly in an adjusting direction of the adjusting element, than the similar adjusting mechanism in the prior art headlight.

In a preferred embodiment of the headlight according to the invention the spherical-segment-shaped outer section of the socket insert is hollow and the adjusting element extends through the spherical-segment-shaped outer section. These latter features allow even more space to be saved.

The spherical receptacle in a further modification of the invention has an outer periphery provided with a through-going opening formed so that the socket insert with the spherical-segment-shaped outer section is insertable into the spherical receptacle of the pivot means mount transversely to an adjusting direction of the adjusting element. The pivot means mount advantageously has a cylindrical portion connected to the spherical receptacle but positioned closer to the reflector than the spherical receptacle. The ball socket of the socket insert is arranged inside the cylindrical portion. These features provide a particularly simple mounting for the socket insert and a correspondingly simple structure for the reflector position adjustment mechanism according to the invention.

It is especially advantageous when the spherical-segment-shaped outer section of the socket insert is held in a locking manner in the spherical receptacle of the pivot means mount. The pivot mount means can be provided with at least one gripping arm gripping the spherical-segment-shaped outer section of the socket insert and elastically pivotable in a direction transverse to an insertion direction of the socket insert so that the spherical-segment-shaped outer section of the socket insert is held in the spherical receptacle.

In other embodiments the spherical receptacle can be elastically deformable, the throughgoing opening of the spherical receptacle can extend over less than half of its outer periphery and the ball socket of the socket insert is insertable into the spherical receptacle by elastic deformation. The socket insert can have a twin-armed lever including two lever arms, one of which being operable for engagement with the ball end of the adjusting element to hold the ball end in the ball socket of the socket insert and another of which being operable for release of the ball end.

In further embodiments of the headlight according to the invention the pivot mount means is made of an elastically deformable material, advantageously is a plastic injection molded part, and the spherical receptacle is in one piece with the pivot mount means. Furthermore it is particularly convenient when the socket insert is made of an elastically deformable material and includes spherical-segment-shaped outer section, the ball socket and, if necessary, the twin-armed lever in one piece.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
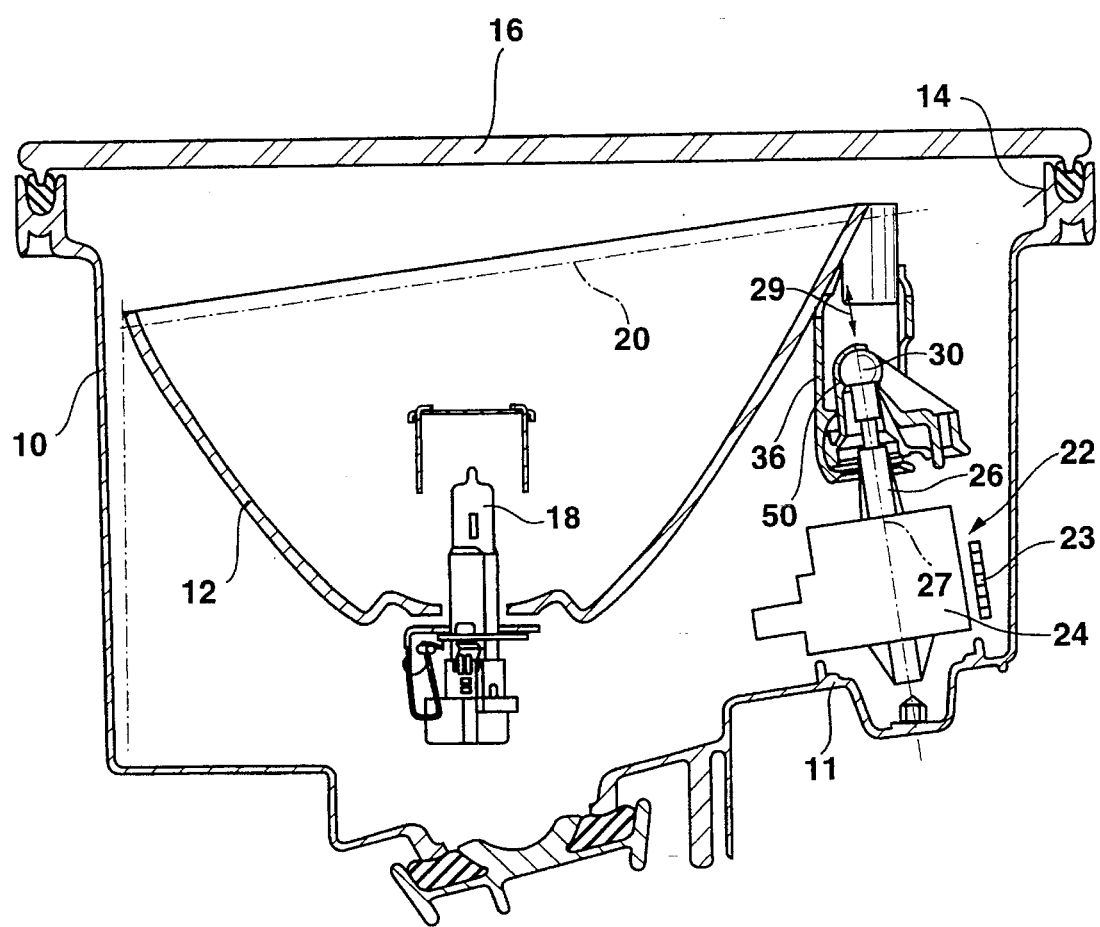
FIG. 1 is a horizontal longitudinal cross-sectional view through a headlight for a self-propelled vehicle showing a pivot joint of an adjusting mechanism.

A headlight for a self-propelled vehicle, particularly a motor vehicle, according to the invention is shown only in cross section in FIG. 1 and has a holder 10 in the form of a housing, in which at least one reflector 12 is pivotally mounted. The holder 10 can also be formed as a frame in other embodiments and the reflector 12 would be mounted on the frame. The housing forming the holder 10 in the embodiment shown in FIG. 1 has a front end with a light outlet opening 14, which is covered with a light-permeable cover 16. The cover 16 is attached to the housing or holder 10 and can be made of glass or plastic.

The cover 16 can be smooth or provided with optical elements. A light source 18, which can be a gas discharge lamp or an incandescent lamp, is mounted in the reflector 12 in the vicinity of its apex. Several reflector sections could be arranged in the holder 10 and formed in one piece with each other or rigidly connected with each other to form the reflector. The reflector 12 can be made of metal or plastic, e.g. duroplastic material.

The reflector 12 is pivotally mounted in the headlight housing 10 at least about one horizontal reflector pivot axis 20, so that the reflector 12 is adjustable in its inclination. However the reflector 12 could also be pivotable about a vertical reflector pivot axis so that it is possible to orient the reflector in a predetermined horizontal direction. An adjusting means 22 for pivoting the reflector, which is arranged in the holder or housing 10, is provided to adjust the inclination or orientation of the reflector 12. The adjusting means 22 in the embodiment shown in the drawing comprises an electric motor 24 and an unshown reduction gear by which an adjusting element 26, which is, in this embodiment, is a rod, is driven. The electric motor 24 is held by a motor holder 23 in the headlight housing 10. The adjustment means 22 is arranged between the rear wall 11 of the headlight housing 10 and the rear side of the reflector 12 displaced from the apex region of the reflector 12. Alternatively, in unshown embodiments the adjustment means 22 can be hydraulic or pneumatic instead of the electromechanical drive including the electric motor and reduction gear. When the electric motor 24 is operated, the adjusting element 26 is moved in its longitudinal direction 27 as shown by the double arrow 29. The adjusting element 26 has a ball end 30 remote from the electric motor 24.

Figure 2:
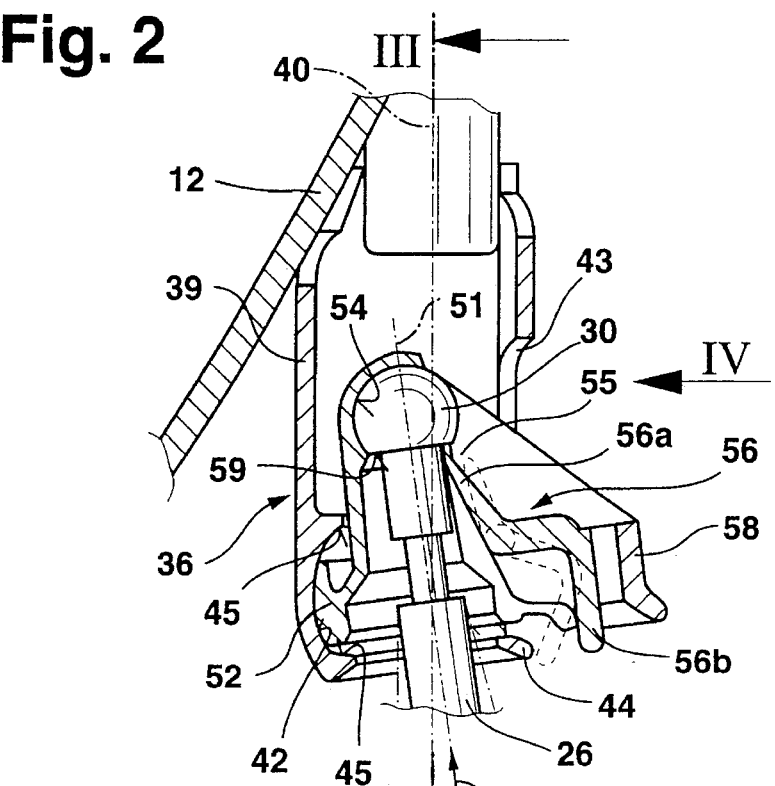
FIG. 2 is a detailed cutaway cross-sectional view of the pivot joint of the adjusting mechanism shown in FIG. 1.
Figure 3:
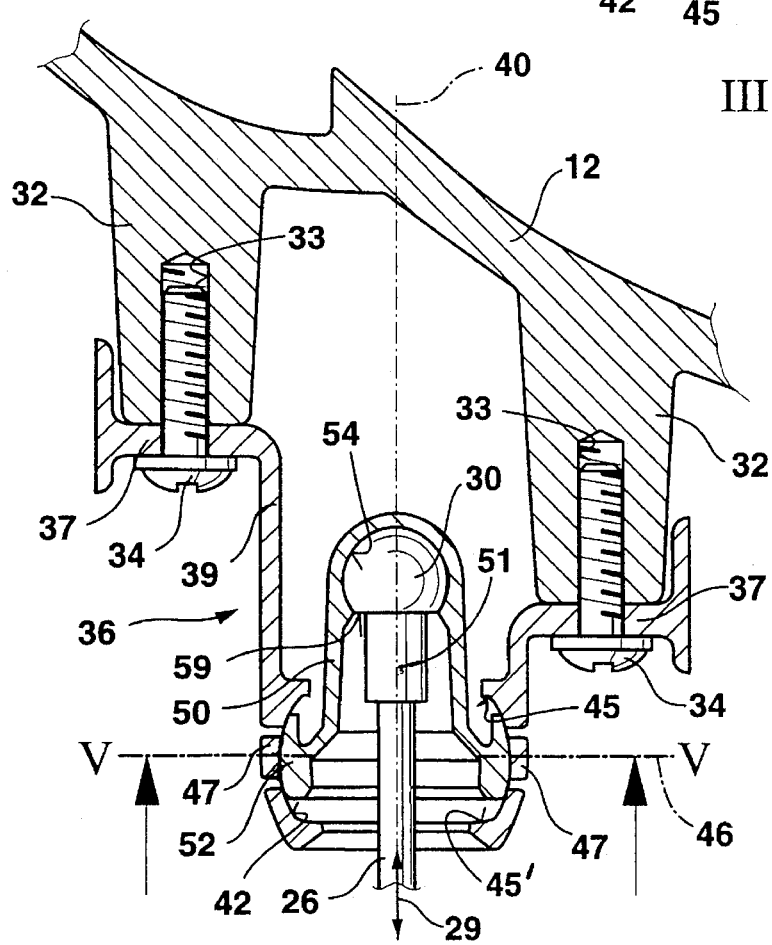
FIG. 3 is a detailed longitudinal cross-sectional view of the pivot joint of FIG. 1 taken along the section line III—III of FIG. 2.
Figure 4:
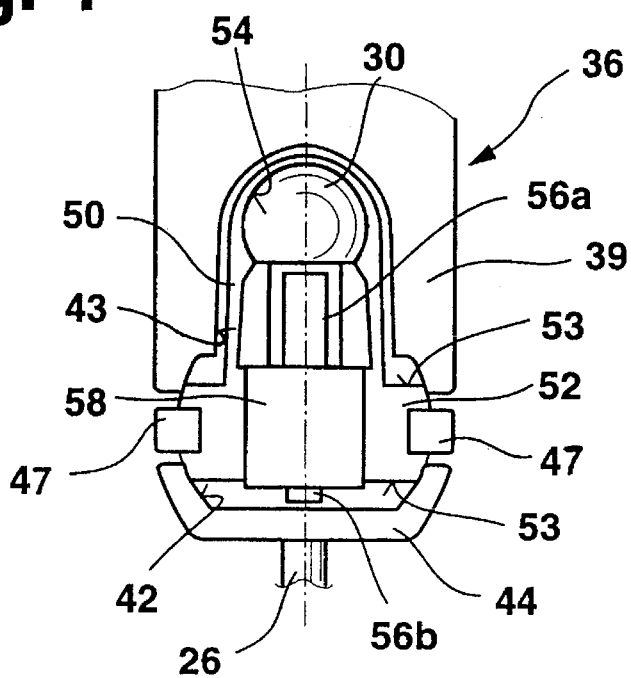
FIG. 4 is a plan view of the pivot joint of FIG. 1 as seen in the direction of the arrow IV in FIG. 2.

Two dome portions 32 extend or protrude axially from the rear side of the reflector 12 as shown in FIG. 3, each of which have an axial blind hole 33. A pivot means mount 36 is connected with the reflector 12 by two screws 34 screwed into the blind holes 33. The pivot means mount 36 has two bearing elements 37, through which the screws 34 extend and which bear on the surfaces of the dome portions 32 facing away from the reflector 12. The pivot means mount 36 comprises an approximately cylindrical portion 39 provided with a longitudinal axis 40 which is in one piece with the bearing elements 37 and a spherical receptacle 42 connected to it. The spherical receptacle 42 is formed in an end of the pivot means mount 36 remote from the reflector 12. The spherical receptacle 42 is provided with a throughgoing opening 43 in its outer periphery as shown in FIG. 2, which means that the spherical receptacle 42 is not closed over its entire circumference around its longitudinal axis 40. The opening 43, as shown in FIGS. 2 and 4, extends in the direction of the longitudinal axis 40 inwardly toward the reflector 12 into the cylindrical portion 39 of the pivot means mount 36, but does not extend to the end of the cylindrical portion next to the reflector 12. The spherical receptacle 42 has a closing wall 44 perpendicular to the longitudinal axis 40 which extends up to, but does not close, the opening 43 on its end which is remote from the reflector 12.

The spherical receptacle 42 has a throughgoing passage coaxial to the longitudinal axis 40 so that the spherical receptacle 42 is open. The throughgoing passage connects the opening 43 at the closing wall 44 and the cylindrical portion 39. The spherical receptacle 42 has a step portion 45 which protrudes inwardly perpendicular to the longitudinal axis 40 in the vicinity of the cylindrical portion 39 and another step portion 45' which protrudes inwardly approximately perpendicular to the longitudinal axis at the closing wall 44. The spherical receptacle 42 has two diametrically opposed, spherically curved gripping arms 47 in its outer periphery. These gripping arms 47 are located in a central plane 46 perpendicular to the longitudinal axis 40 of the pivot means mount 36. These spherically curved gripping arms 47 are flexible and can bend or pivot outward. The gripping arms 47 extend over more than half the outer periphery of the spherical receptacle 42, so that they form an undercut and the spacing between their ends is less than the diameter of the spherical receptacle. The gripping arms 47 could be formed so that the spherical receptacle 42 is provided with two slots, with each gripping arm 47 standing between the slots. The pivot means mount 36 is formed advantageously as an injection molded part. The bearing elements 37, the cylindrical portion 39 and the spherical receptacle 42 are advantageously in one piece and made from an elastically deformable plastic material, e.g. a thermoplastic material.

Figure 5:
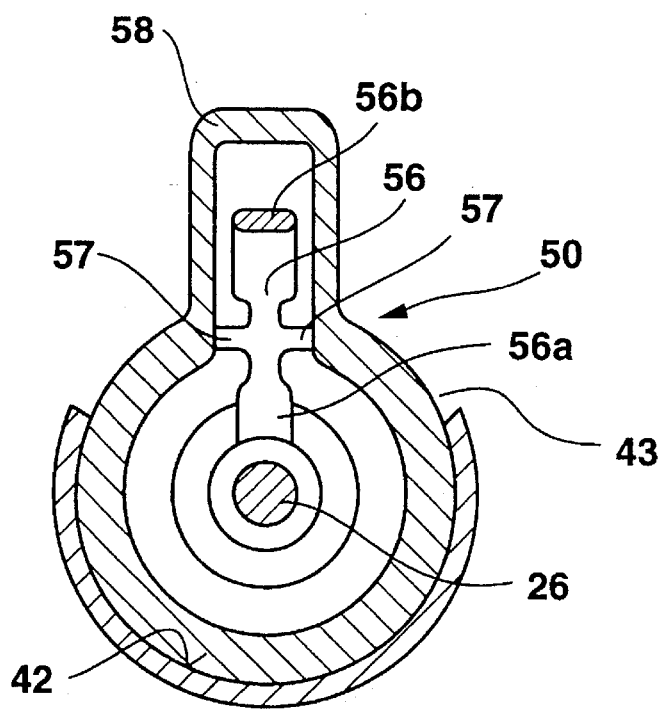
FIG. 5 is a cross-sectional view of another embodiment of the pivot joint as it would appear along the section line V—V of FIG. 3.

A socket insert 50 is held in the pivot means mount 36. The socket insert 50 has a spherical-segment-shaped outer section 52 which is pivotally mounted in the spherical receptacle 42 of the pivot means mount 36. The spherical-segment-shaped outer section 52 is bounded in a direction of longitudinal axis 51 of the socket insert 50 by a wall 53 approximately perpendicular to the longitudinal axis 51. The socket insert 50 has a ball socket 54 open in a direction pointing away from reflector 12 in its end closest to the reflector 12. The socket insert 50 is hollow from an end of the spherical-segment-shaped outer section 52 remote from the rear side of the reflector 12 to the ball socket 54. The ball socket 54 and the spherical-segment-shaped outer section 52 of socket insert 50 are not closed around their entire circumference about longitudinal axis 51, but are provided with a lateral opening 55. A twin-armed pivotable lever 56 is arranged in lateral opening 55, whose one lever arm 56a points to the ball socket inside the pivot means mount 36 and whose other lever arm 56b points to the exterior of the pivot means mount 36 away from the reflector 12. The socket insert 50 with the lever 56 is pivotally mounted in its central region between both its lever arms 56a, 56b, so that the lever 56 takes its initial position as shown in FIG. 2 with solid lines, but is elastically pivotable into the position shown with the dashed lines in FIG. 2. Advantageously the lever 56 is formed in one piece with the socket insert 50 and, as shown in FIG. 5, can be formed by two crosspieces 57 in a portion of the socket insert 50 reduced in its cross-section so that the lever 56 is pivotable when external forces act on it to elastically deform the crosspieces 57 and returns automatically into its initial position without external forces acting on it. The socket insert 50 has a U-shaped handle-like member 58 overlapping the lever 56 and arranged outside of the lever 56, between whose members the lever 56 is positioned. The socket insert 50 is advantageously an injection molded part, which includes the U-shaped handle member 58, the lever 56, the ball socket 54 and the spherical-segment-shaped outer section 52 in one piece and is made of an elastically deformable plastic material, e.g. thermoplastic material. The socket insert 50 is movable transversely to the adjusting direction 29 of the adjusting element through the opening 43 in the pivot means mount 36 so that it is held with its spherical-segment-shaped outer section 52 in the spherical receptacle 42. Thus the spherical-segment-shaped outer section 52 of the socket insert 50 is pushed between the gripping arms 47, which swing outwardly until the outer section 52 rests in the spherical receptacle 42, and the elastic gripping arms 47 then return to their original position so that the outer section 52 is held in a locked manner in the spherical receptacle 42. The socket insert 50 is pivotally received in the pivot means mount 36 so that the ball socket of the socket insert is arranged with play in the cylindrical portion 39 of the pivot means mount 36 to allow it to pivot. The pivotability of the socket insert 50 in the pivot means mount 36 is limited by the contact of the wall 53 bounding the outer section 52 on the step portion 45. The adjusting element 26 with its ball end 30 and the socket insert can be inserted through the open closing wall 45 of the pivot means mount 36. The elastic lever arm 56a of the lever 56 is bent outwardly by the ball end 30 until the ball end 30 contacts in the ball socket 54. In this position the lever arm 56a of the lever 56 pivots inside and holds the ball end 30 in the ball socket 54 against any force tending to pull it out in the adjusting direction 29 of the adjusting element 26. A shoulder 59 facing away from the reflector 12 is formed in the ball end 30 at the transition between the adjusting element 26 and the ball end 30, on which the lever arm 56a of the lever 56 engages and because of that the withdrawal of the ball end 30 from the ball socket 54 is prevented. For an intentional disassembly of the adjusting element 26 a force can be applied to lever arm 56b of the lever 56 in a direction toward the adjusting element 26 with a tool so that the lever arm 56b is pivoted inwardly and the corresponding lever arm 56a is pivoted outwardly so that the ball head 30 is released so that the adjusting element 26 can be pulled out from the ball socket 54. A motion of the reflector 12 transversely to the adjusting direction 29 also occurs during the pivoting motion of the reflector 12 caused by the adjusting motion of the adjusting element 26 in the adjusting direction 29. During the pivoting motion of the reflector 12 caused by the adjusting motion of the adjusting element 26, the motion of the reflector 12 is compensated by the pivoting motion of the ball end 30 in the ball socket 54 and of the spherical-segment-shaped outer section 52 in the spherical receptacle 42, so that no bending moments and/or transverse forces act on the adjusting element 26. Because the spherical-segment-shaped outer section 52 of the socket insert 50 and the spherical receptacle 42 receiving it are arranged between the ball end 30 of the adjusting element 26 and the adjusting mechanism 22 the double-jointed pivot joint according to the invention requires no more space in the adjusting direction than a simple pivot joint of the prior art having an adjusting element 26 connected with the reflector 12 only by engaging its ball end 30 in a ball socket 54.

Another embodiment of the adjusting mechanism for the headlight is shown in part in FIG. 5. A modified form of the pivot means mount 36 is shown in FIG. 5 in which the gripping arms 47 are eliminated. The spherical receptacle 42 is formed so that the opening 43 extends over less than half the circumference of the spherical receptacle 42 around the longitudinal axis 40. The spherical receptacle 42 thus forms an undercut so that the spherical-segment-shaped outer section 52 of the socket insert 50 is held in a locking manner in the spherical receptacle 42. The spherical receptacle 42 is made of an elastic or resilient material so that the opening 43 can widen due to elastic deformation for insertion of the spherical-segment-shaped outer section 52 of the socket insert 50 and, after insertion of the outer section 52, when it bears on the spherical receptacle 42, the spherical receptacle 42 again contracts so that the spherical-segment-shaped outer section 52 of the socket insert 50 is held in a locking manner in the spherical receptacle 42.

While the invention has been illustrated and described as embodied in a headlight for a self-propelled vehicle, especially a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A headlight for a self-propelled vehicle, said headlight comprising at least one pivotable reflector (12) having at least one reflector pivot axis (20), means (10) for holding the at least one pivotable reflector (12) and means for pivoting the reflector (12) relative to the means (10) for holding and about said at least one reflector pivot axis for adjustment of a reflector orientation, wherein said means for pivoting the reflector includes an adjusting element (26) having a ball end (30), said adjusting element (26) being eccentrically engaged with the reflector (12) relative to the at least one reflector pivot axis (20), and a double-jointed pivotal connection means for pivotally connecting the adjusting element (26) with the reflector (12), said double-jointed pivotal connection means comprising a pivot means mount (36) provided with a spherical receptacle (42) and a socket insert (50) having a spherical-segment-shaped outer section (52) pivotally engaged in the spherical receptacle (42) of the pivot means mount (36), and wherein said socket insert (50) has a ball socket (54) in which said ball end (30) of said adjusting element (26) is engaged so that said adjusting element (26) is pivotally connected with said socket insert (50), and said ball socket (54) of the socket insert (50) is positioned closer to said reflector (12) than said spherical receptacle (42) of said pivot means mount (36).

2. The headlight as defined in claim 1, wherein the spherical-segment-shaped outer section (52) of the socket insert (50) is hollow and the adjusting element (26) extends through the spherical-segment-shaped outer section (52).

3. The headlight as defined in claim 2, wherein the pivot means mount (36) has a longitudinal axis (40) and the spherical receptacle (42) has an outer periphery provided with a throughgoing opening (43) formed so that said socket insert (50) with said spherical-segment-shaped outer section (52) is insertable through the opening (43) into said spherical receptacle (42) of said pivot means mount (36) transversely to an adjusting direction (29) of said adjusting element (26).

4. The headlight as defined in claim 3, wherein the pivot means mount (36) has a cylindrical portion (39) connected to the spherical receptacle (42), said cylindrical portion (39) being closer to said reflector (12) than the spherical receptacle (42), and the ball socket (54) of the socket insert (50) is arranged inside of the cylindrical portion (39).

5. The headlight as defined in claim 4, wherein the spherical-segment-shaped outer section (52) of the socket insert (50) is held in a locking manner in the spherical receptacle (42) of the pivot means mount (36).

6. The headlight as defined in claim 5, wherein the pivot mount means (36) has at least one flexible gripping arm (47), said at least one flexible gripping arm (47) gripping the spherical-segment-shaped outer section (52) of the socket insert (50) and being bendable in a direction transverse to an insertion direction of said socket insert (50) so that the spherical-segment-shaped outer section (52) of the socket insert (50) is held in the spherical receptacle (42).

7. The headlight as defined in claim 5, wherein the spherical receptacle (42) is elastically deformable, the throughgoing opening (43) of the spherical receptacle (42) extends over less than half of said outer periphery of said spherical receptacle (42) and the ball socket (52) of the socket insert (50) is insertable into the spherical receptacle (42) by elastic deformation of said spherical receptacle (42).

8. The headlight as defined in claim 1, wherein the socket insert (50) has a twin-armed lever (56) including two lever arms (56a,56b), one (56a) of said lever arms being positionable to engage said ball end (30) of said adjusting element (26) to hold said ball end (30) in said ball socket (54) of said socket insert (50) and another (56b) of said lever arms being operable by an external force for release of said ball end (30) of said adjusting element (26) from said ball socket (54).

9. The headlight as defined in claim 1, wherein the pivot mount means (36) is made of an elastically deformable material and said spherical receptacle (42) is in one piece with the pivot mount means (36).

10. The headlight as defined in claim 9, wherein said pivot mount means (36) is a plastic injection molded article.

11. The headlight as defined in claim 1, wherein the socket insert (50) is made of an elastically deformable material and said spherical-segment-shaped outer section (52) and said ball socket (54) are in one piece in the socket insert (50).

12. The headlight as defined in claim 11, wherein said socket insert (50) is a plastic injection molded article.

13. The headlight as defined in claim 8, wherein the socket insert (50) is made of an elastically deformable material and said spherical-segment-shaped outer section (52), said twin-armed lever (56) and said ball socket (54) are in one piece in the socket insert (50).

14. The headlight as defined in claim 13, wherein said socket insert (50) is a plastic injection molded article.

* * * * *